Dec. 25, 1923.
A. C. SCHNAKE
GLARE PROTECTOR
Filed Feb. 28, 1922
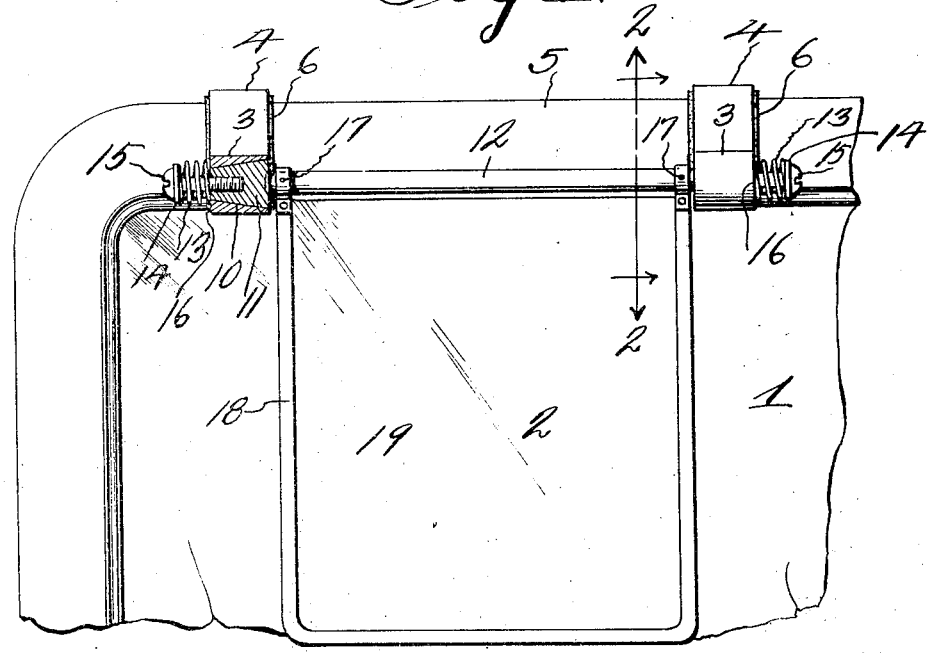
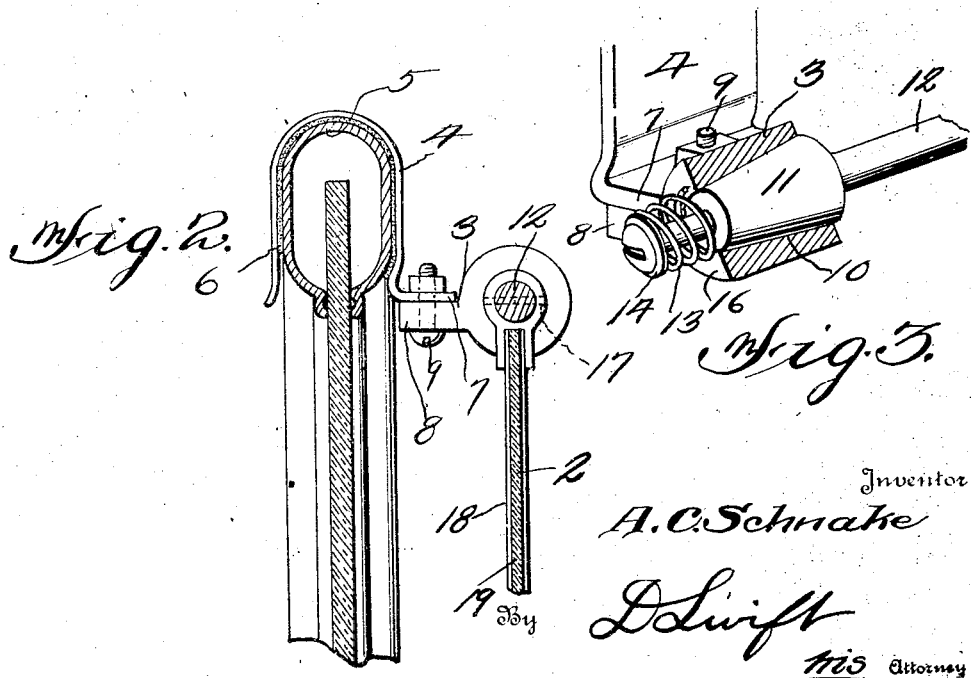

Patented Dec. 25, 1923.

1,478,799

UNITED STATES PATENT OFFICE.

AUGUST C. SCHNAKE, OF CENTRALIA, ILLINOIS.

GLARE PROTECTOR.

Application filed February 28, 1922. Serial No. 539,815.

*To all whom it may concern:*

Be it known that I, AUGUST C. SCHNAKE, a citizen of the United States, residing at Centralia, in the county of Clinton, State of Illinois, have invented a new and useful Glare Protector; and I do hereby declare the following to be a full, clear, and exact description of the invention, such as will enable others skilled in the art to which it appertains to make and use the same.

The invention relates to glare protectors used in connection with automobiles, and has for its object to provide a device of this character which may be easily and quickly attached to a windshield and comprises windshield engaging brackets between which brackets is pivotally mounted a glare shield, preferably colored glass, and which glare shield may be held in various positions for preventing blinding of the operator by the light rays from lights of approaching automobiles.

A further object is to provide means whereby the shield may be moved by the operator, with one hand, and automatically held in any position to which it may be moved.

A further object is to provide a glare protector comprising spring brackets adapted to engage over the upper rail of the frame of the windshield and terminating in axially aligned members having cone shaped bearings therein, a glare deflecting shield disposed between the bearings and provided with cone shaped bearing members disposed in the bearings and held in frictional engagement therein by means of springs.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

Figure 1 is a view in elevation of the device, showing the same applied to a portion of a windshield and one of the bearings in section.

Figure 2 is an enlarged sectional view through the upper side of the windshield and the glare protector.

Figure 3 is a detail perspective view of one of the bearing sleeves and bearings and a portion of one of the brackets.

Referring to the drawing, the numeral 1 designates a conventional form of windshield and 2 the glare protector carried thereby. The glare protector comprises spaced brackets 3 having curved spring arms 4 adapted to engage over the upper rail 5 of the windshield and frictionally engage the same, a lining 6 of felt or the like being preferably interposed between the spring arms 4 and the rail 5 for preventing scratching or marring of the rail. It will be seen that the brackets 3 may be easily and quickly applied to a windshield and that by providing the spring arms 4, the device may be applied to windshields having rails 5 of different sizes. It will also be seen that the windshield is not modified in any manner when the device is applied thereto.

The spring arms 4 are provided with right angled portions 7, which right angled portions are secured to the ears 8 of the brackets 3 by means of bolts 9, which bolts pass through the right angled portions 7 and the ears 8. The brackets 8 have conically shaped bearings 10, which bearings receive the conically shaped members 11 of the rod 12. The conically shaped members 11 tapering outwardly and are received in the bearings 10 and held frictionally therein by means of coiled springs 13, which springs are interposed between the washers 14 carried by screws 15 and the outer end 16 of the brackets 3, said screws forming means whereby the tension of the springs 13 may be varied. It will be seen that the springs 13 will force the brackets 3 towards each other and will maintain a frictional engagement of the conically shaped members 11 in the bearings 10 of the brackets. The brackets 10 are as a whole forced towards each other by the springs 13, which springs are of sufficient strength to overcome the frictional engagement of the spring arms 4 on the rail 5. The rod 12 has secured thereto at 17, the frame 18 which frame is provided with a colored glass 19, which glass in connection with frame 18 forms the glare protector 2.

The frictional engagement of the cone shaped members 11 with the bearings 10 is sufficient to hold the glare deflector 2 in any position to which it may be moved, therefore it will be seen that the operator may move the deflector to any position desired by the use of one hand and that the glare deflector will be maintained in any position to which it may have been moved by the frictional engagement of the conically shaped members 11 in the conically shaped bearings 10.

From the above it will be seen that a glare protector for automobiles is provided, which glare protector is simple in construction, positive in its operation and may be applied to various types and sizes of windshields without modifying or changing the construction of the windshield.

The invention having been set forth what is claimed as new and useful is:—

The combination with the upper rail of a vehicle windshield, of a glare protector carried thereby, said glare protector comprising U-shaped members frictionally and slidably mounted on the rail, said U-shaped members having one of their arms provided with a horizontally disposed ear, said glare protector being carried by spaced brackets having sockets, friction members carried by the glare protector and disposed within the sockets, horizontally disposed ears carried by the spaced members and pivotally connected to the horizontal ears of the U-shaped members and forming means whereby the spaced members may move in a horizontal plane and spring means for forcing said spaced members toward each other.

In testimony whereof I have signed my name to this specification in the presence of two subscribing witnesses.

AUGUST C. SCHNAKE.

Witnesses:
W. V. WAYMAN,
L. O. WILSON.